(No Model.)

A. F. W. PARTZ.
VOLTAIC BATTERY.

No. 353,757. Patented Dec. 7, 1886.

Witnesses:
R. T. Frailey
Claude R. Norton

Inventor:
August F. W. Partz.

UNITED STATES PATENT OFFICE.

AUGUST F. W. PARTZ, OF PHILADELPHIA, PENNSYLVANIA, ASSIGNOR TO THE PARTZ ELECTRIC BATTERY COMPANY, OF SAME PLACE.

VOLTAIC BATTERY.

SPECIFICATION forming part of Letters Patent No. 353,757, dated December 7, 1886.

Application filed March 5, 1885. Serial No. 157,766. (No model.)

*To all whom it may concern:*

Be it known that I, AUGUST F. W. PARTZ, a citizen of the United States, residing at Philadelphia, in the State of Pennsylvania, have invented a certain Improvement in Voltaic Batteries, of which the following is a full and exact description, reference being had to the accompanying drawings.

The object of this invention is to practically prevent in batteries containing porous clay cells, but made to operate on the gravity principle, whether they be of the Daniell or of the Bunsen type, the depolarizing solutions which cover the cathodes from diffusing through the porous cells, and to do so without decreasing the capacity of these cells for the liquids in which the anodes are to dissolve, so as to obviate an early saturation and frequent renewal of those liquids.

The invention consists in a porous clay cell, the lower part of which is to a proper height rendered impervious by being impregnated with paraffine, so that, when placed upon a metallic or carbon cathode at the bottom of a voltaic element, it cannot be penetrated by the depolarizing liquid about its base, and that thus the anode inside of it be protected against wasteful action.

Figure 1:
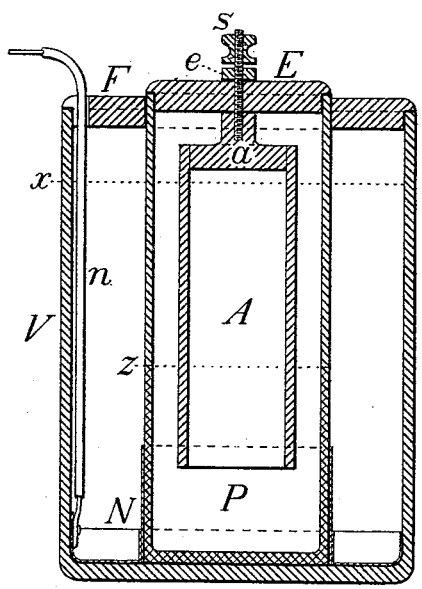
Figure 2:
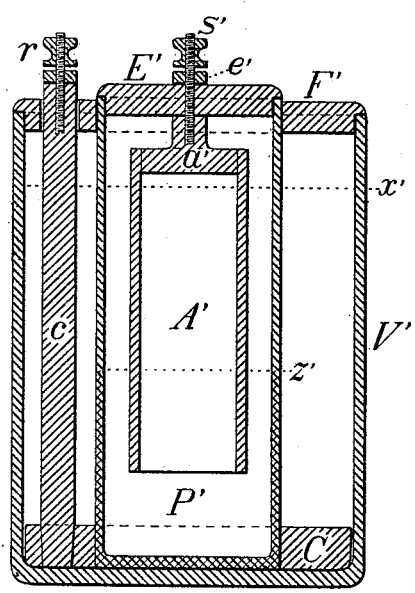

In the drawings hereto, Figures 1 and 2 represent vertical sections of two voltaic elements, one of the Daniell and the other of the Bunsen type, both embodying my invention.

V V' are round or square vessels of glass. P P' are cylindrical porous clay cells, the lower parts of which up to the dotted lines $z$ $z'$ are made impermeable by being soaked in molten paraffine. The cells project through covers of wood or ebonite, F F', and are themselves provided with covers E E', from which are suspended the anodes A A', consisting of cylinders of sheet-zinc fastened to pieces $a$ $a'$ of the same metal, in which are inserted the stems of binding-screws $s$ $s'$ and of check-nuts $e$ $e'$. N is a cathode of sheet-copper fitted upon the bottom of the vessel V, so as not to be liable to shift.

$n$ is an insulated pole wire riveted to the copper, and passing through a notch or hole in the cover F.

C is a cathode of carbon covering the bottom of the vessel V' around the cell P', and holding a firmly-inserted pole-rod of carbon, $c$, which extends through a hole in the cover F', and is furnished with a binding-screw, $r$.

The element, Fig. 1, I charge by filling the porous cell, as well as the outer vessel, up to the dotted line $z$ with a solution of sulphate of magnesia about two-thirds saturated, and then dropping a quantity of sulphate of copper in crystals upon the cathode.

In the element, Fig. 2, I fill the space around the porous cell to the height of the dotted line $z'$ with either dilute sulphuric or dilute hydrochloric acid, and the porous cell correspondingly with a solution either of sulphate of magnesia or of chloride of sodium, and then drop bichromate of potash in crystals upon the cathode.

I am aware that heretofore in batteries of the Daniell type, made to work on the gravity principle, porous clay cells have been suspended high enough not to be penetrated by the saturated solution of copper beneath them; but the advantage gained by this device is offset by the disadvantage that it necessitates a considerable reduction of the capacity of the porous cells, and therefore of the quantity of the liquid in which the zinc is to dissolve, while such a reduction increases proportionately the amount of attention to be bestowed upon the apparatus.

Having found varnishing as well as glazing to be impracticable means of rendering parts of porous clay cells impervious and attained satisfactory results only by paraffining them, I confine myself to this means, and claim as my invention—

In a voltaic element on the gravity principle, a porous clay cell, of which the lower part is impregnated with paraffine, substantially as and for the purpose herein specified.

AUGUST F. W. PARTZ.

Witnesses:
CLAUDE R. NORTON,
R. T. FRAILEY.